United States Patent [19]
Goodbold

[11] Patent Number: 5,697,597
[45] Date of Patent: Dec. 16, 1997

[54] SNOWMOBILE ENTRENCHMENT LIFTING DEVICE

[76] Inventor: Frank Goodbold, P.O. Box 669, Centerville, Utah 84014

[21] Appl. No.: 782,196

[22] Filed: Jan. 10, 1997

[51] Int. Cl.$^6$ .................. B60P 1/14; B66F 3/00
[52] U.S. Cl. .......... 254/4 B; 254/47; 254/252; 254/131; 254/133; 254/134
[58] Field of Search .................. 254/133, 4 R, 254/134.3 CL, 133 A, 4 B, 47, 131, 426, 252, 251, 257

[56] References Cited

U.S. PATENT DOCUMENTS

| | | |
|---|---|---|
| 336,189 | 2/1886 | White .................. 254/131 |
| 385,998 | 7/1888 | Chase . |
| 434,701 | 8/1890 | Conway . |
| 502,397 | 8/1893 | Emons . |
| 559,513 | 5/1896 | Carr . |
| 959,988 | 5/1910 | Bobb . |
| 1,179,132 | 4/1916 | Moffitt . |
| 1,259,559 | 3/1918 | Rud . |
| 1,775,207 | 9/1930 | Miller .................. 254/251 |
| 2,643,856 | 6/1953 | Sales . |
| 2,648,521 | 8/1953 | Sales . |
| 3,580,543 | 5/1971 | Hafeli . |
| 3,964,729 | 6/1976 | Harlow .................. 254/131 |
| 4,643,396 | 2/1987 | Beals . |
| 4,771,988 | 9/1988 | Scroggins, Sr. .................. 254/47 |
| 5,135,200 | 8/1992 | Neibrandt . |
| 5,618,030 | 4/1997 | Eggert .................. 254/131 |

*Primary Examiner*—Timothy V. Eley
*Assistant Examiner*—Lee Wilson
*Attorney, Agent, or Firm*—Malcolm B. Wittenberg

[57] ABSTRACT

A device for freeing a snowmobile entrenched in snow. Through the use of a vertical first rod, pivoting second rod, pad and a cable, a snowmobile having ski-shaped rudders in its forward end and track-shaped belting at its rearward end can be freed from entrenchment.

17 Claims, 5 Drawing Sheets

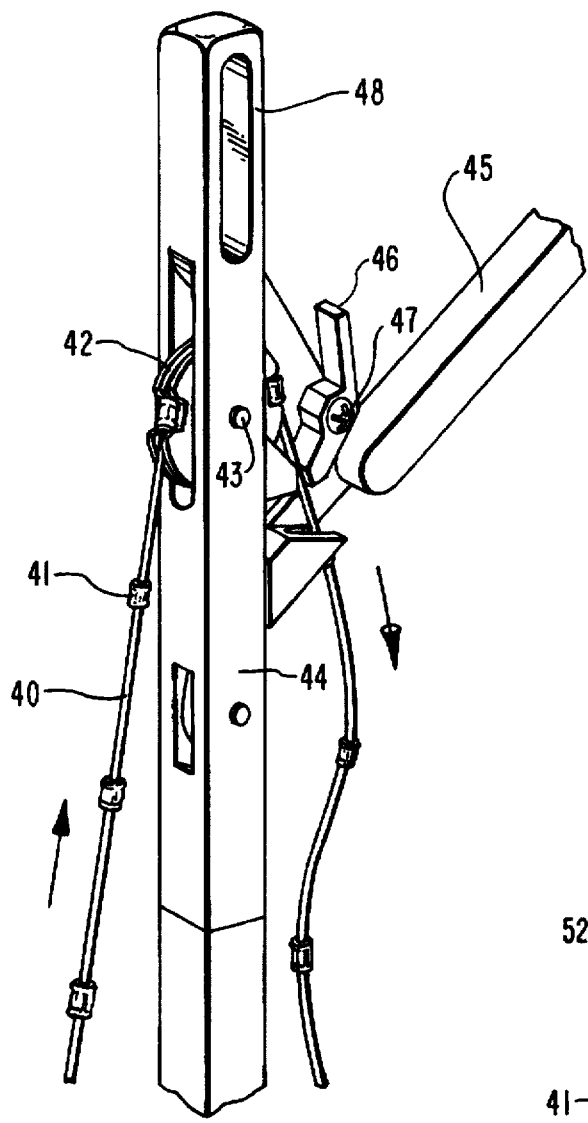
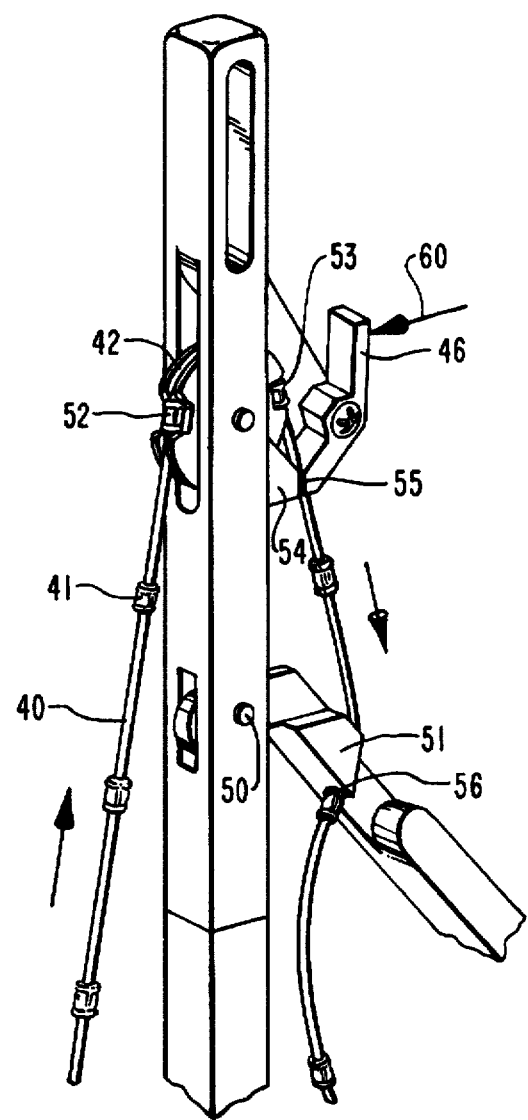
FIG. 7
FIG. 8

SNOWMOBILE ENTRENCHMENT LIFTING DEVICE

TECHNICAL FIELD OF THE INVENTION

The present invention deals with a device which, in its preferred embodiment, is foldably portable and can thus be carried onboard a snowmobile and yet is readily transformed into a convenient device for lifting the rear end of a typical snowmobile from entrenchment.

BACKGROUND OF THE INVENTION

Snowmobiles are becoming increasingly popular both as recreational vehicles and as a means of convenient travel in heavy snow pack where other forms of transportation are either inconvenient or nonexistent. Certainly, for ski rescue teams that are called upon to quickly travel to an injured skier located in mountainous terrain, there is no other form of transportation which could be considered the equivalent of a snowmobile.

Although snowmobiles are widely used and are recognized as convenient and often necessary forms of transportation, it has been found that they commonly suffer from the problem of entrenchment. Entrenchment is most oftentimes encountered when snow is relatively dry, lightly packed and referred to as "powder" conditions. Under such conditions, the rear end of the snowmobile, housing track-like belting which is used to propel the snowmobile, can burrow within the snow pack, making the snowmobile undrivable until its rear end is physically removed from its self-created trench. In that snowmobiles often weigh between 500 to 750 pounds, those with limited physical strength, as well as users suffering from any number of physical disabilities, may be unable to remove the snowmobile from its entrenched position which can result in a dangerous condition, particularly in geographically remote locations and in extreme weather situations where the very survival of the snowmobile operator may depend upon the workability of his or her only effective means of transportation.

It is thus an object of the present invention to provide a device which can be carried onboard a snowmobile and which can be assembled on site in order to free a snowmobile entrenched in snow.

A further object of the present invention is to provide a device for freeing a snowmobile entrenched in snow which can be operated by virtually anyone where limitations in physical strength as well as physical disability would not prevent one from practicing the present invention.

These and further objects will be more readily apparent when considering the following disclosure and dependent claims.

DESCRIPTION OF DRAWINGS

FIGS. 7 and 8 are perspective views of a portion of a second embodiment of the present invention shown in two states of operation.

SUMMARY OF THE INVENTION

The present invention deals with a device and method for using the device for freeing a snowmobile entrenched in snow. Typically, snowmobiles are provided with ski-like rudders at their forward ends and track-like belting at their rearward ends. The track-like belting is driven to propel the snowmobiles through snow.

The device of the present invention comprises a first rod of sufficient length such that when vertically positioned the first rod is of sufficient height to enable the snowmobile to rise from an entrenched position to free its track-like belting from being entrenched in snow. A support pad is located at a first end of the first rod. A second rod is pivotally connected to the first rod and a cable is attached to the first rod. The cable is provided with attachment means at its second end for attachment of the cable to the snowmobile at its rearward end. In a first embodiment, a first guide and camming cleat is located at the second end of the first rod for receiving and allowing for controlled one way travel of the cable. A second guide and camming means is located on the second rod which further receives and allows for controlled one way travel of the cable.

In a second embodiment, a pulley wheel is located at a second end of the first rod and also located proximate the second end of the first rod is means for receiving the cable and for selectively preventing the cable from passing over the pulley in a direction toward the snowmobile. The second embodiment comprises providing the cable with a series of cable buttons periodically and fixedly attached to the cable along its length whereby a means located proximate the second end of the first rod for selectively preventing the cable from passing over the pulley comprises the combination of a clip and stop wherein the clip is spring biased toward the stop and wherein the cable and cable buttons can freely be drawn in a direction away from the snowmobile but the cable buttons are prevented from passing in a direction toward the snowmobile without moving the clip opposite to a spring bias. Means are also located on the second pivoting rod for capturing the cable and drawing the cable in a direction away from the snowmobile as the second rod is moved pivotally with respect to the first rod. Ideally, this latter means comprises an open channel which is sized as to freely allow the passage of the cable but not the cable buttons.

Figure 2:
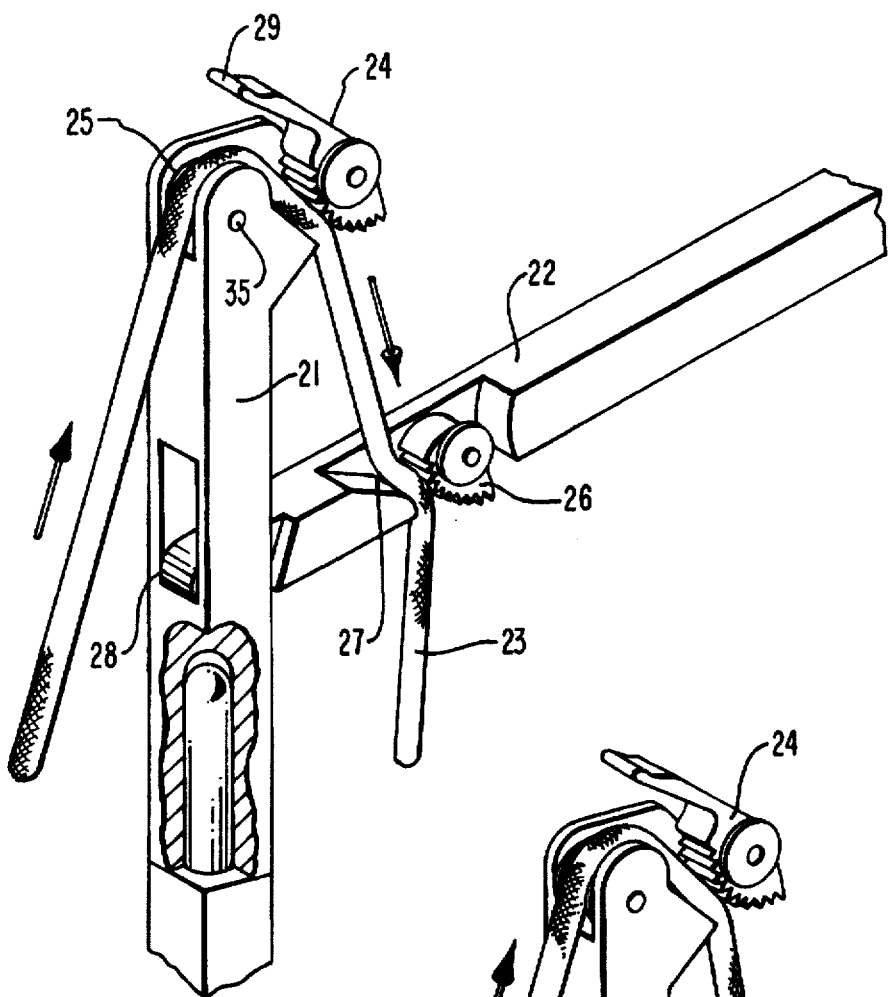
FIGS. 2 and 3 are perspective views of a portion of a first embodiment of the present invention shown in two states of operation.
Figure 3:
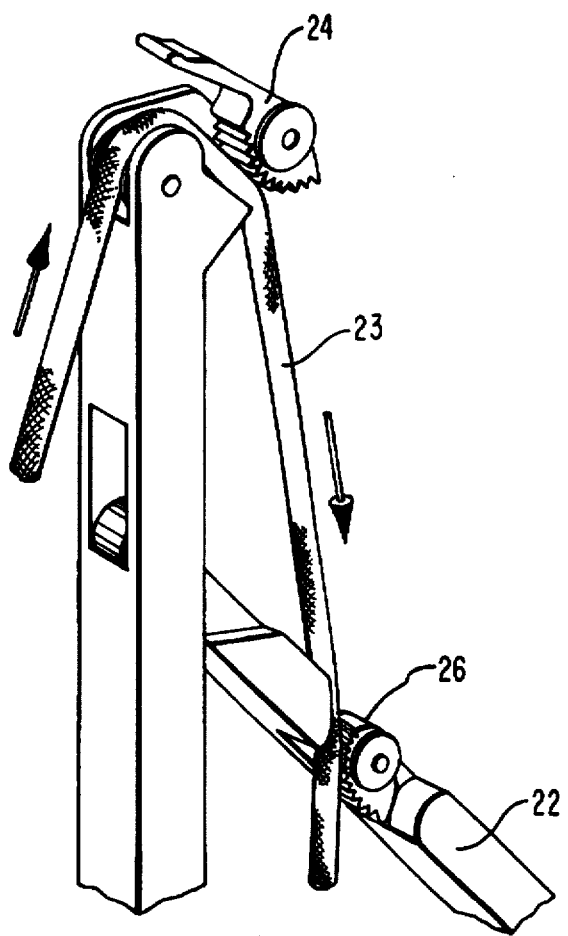

In operation, the support pad is located proximate the rearward end of the snowmobile while the first rod extends vertically from the support pad. As the second rod is pivotally moved repeatedly from a first to a second position, as shown in FIGS. 2 and 3 and in FIGS. 7 and 8, the cable is progressively captured resulting in lifting the rearward end of the snowmobile from its entrenched position.

DETAILED DESCRIPTION OF THE INVENTION

Figure 1:
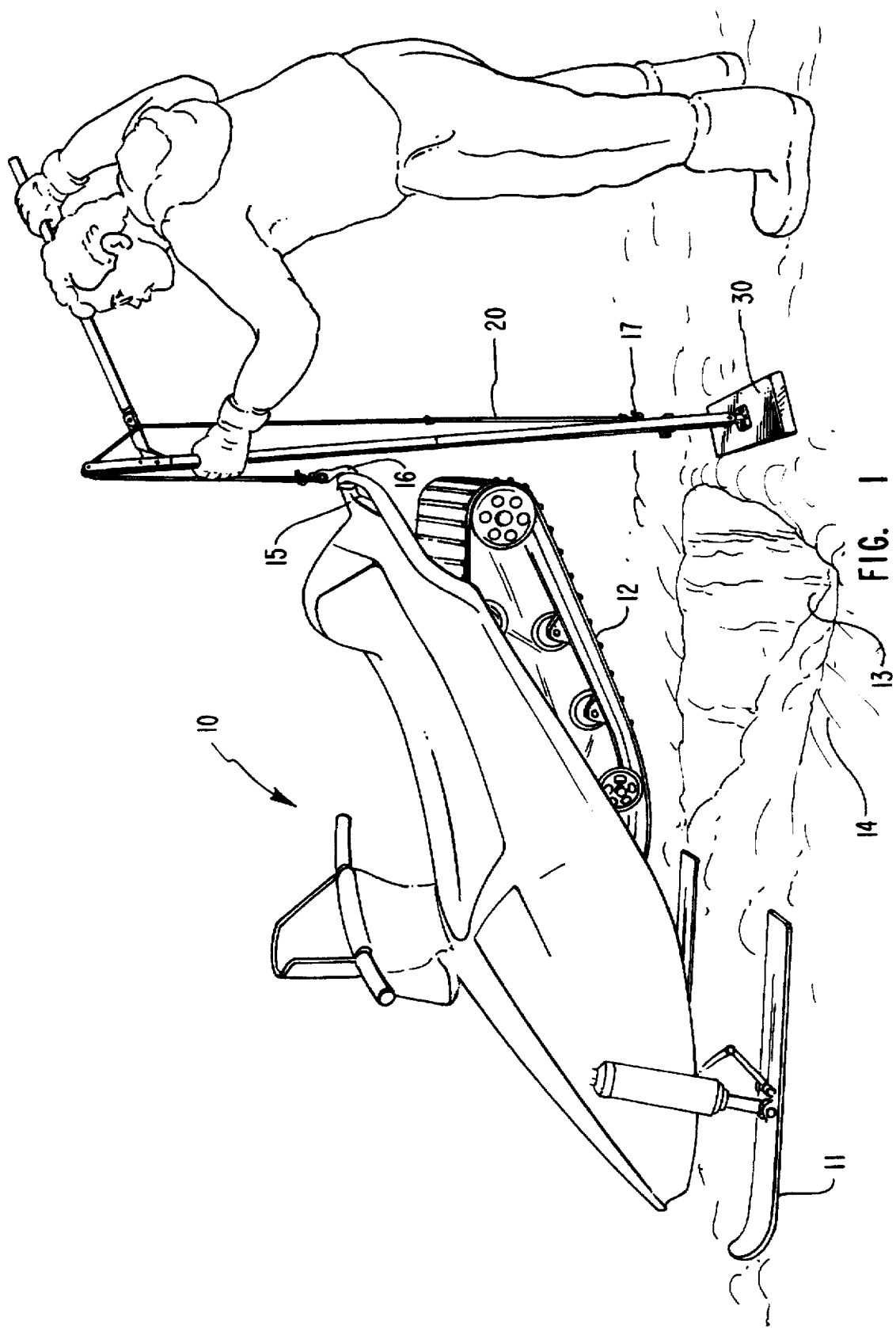
FIG. 1 is a perspective view showing the use of the present invention to free a snowmobile entrenched in snow.

Turning to FIG. 1, element 10 typifies snowmobiles which are provided with ski-like rudders 11 at its forward end and track-like belting 12 at its rearward end. Track-like belting 12 is driven to propel snowmobile 10 through snow 14.

As noted previously, in light "powder" conditions where the snow is relatively dry and deep, track-like belting 12 can burrow within snow 14 resulting in the creation of trench 13 which captures the rear end of the snowmobile. Trench 13 provides an almost quicksand-like character as the more the snowmobile operator attempts to power out of trench 13, the deeper the snowmobile becomes entrenched.

Prior to the present invention, the only way in which a snowmobile operator could remove snowmobile 10 from trench 13 was to stand next to the snowmobile, grab handle 15 and attempt to physically lift the rear end of the snowmobile out of the trench. For anyone with a physical disability, removal of snowmobile 10 from trench 13 could present itself as a daunting task. As noted previously, snowmobiles oftentimes weigh as much as 750 pounds. To free the snowmobile from its self-created trench, the operator must not only lift the snowmobile vertically from the trench but also horizontally away from it so that further motored operation will enable the snowmobile to proceed atop the snow rather than getting further burrowed into it.

The present invention being lightweight, of simple construction and portable enables a snowmobile operator to travel in deep "powder" conditions with a level of security heretofore unobtainable.

FIGS. 2 and 3 demonstrate the fundamental operation of a first embodiment of the present invention. Once snowmobile 10 has been entrenched, the present device is set up from its stored condition (FIG. 6) by first positioning support pad 30 (FIGS. 1, 4 and 5) on snowpack 14 adjacent snowmobile 10 in trench 13. Cable 23 is attached to first rod 21 at attachment point 17. As shown in FIG. 1, first rod 21 is of sufficient height to enable snowmobile 10 to rise from trench 13 to free its track-like belting 12.

Returning to the operation of the present invention, it is noted that cable 23, once again, is attached to first rod 21 at 17 while the second end of the cable is attached to the rearward end of snowmobile 10 by, for example, hook 16 passing within handle portion 15. Cable 23 is then caused to pass through first guide means 25 which can consist of nothing more than a roller pivoted at axle 35 and is captured by camming cleat 24. Cable 23 then passes through second guide 27 which can consist of nothing more than a rammed portion of second rod 22 and is captured by camming cleat 26 pivoted onto second rod 22 as shown.

As second rod 22 is moved in a downward direction, camming cleats 24 and 26 capture cable 23 and pull the cable in the direction of travel of second rod 22, thus capturing the cable and lifting the rear end of snowmobile 10. This movement is shown by comparing the position of second rod 22 in FIGS. 2 and 3. The camming cleats, being one way cleats, capture cable 23 as second rod 22 moves in a downward direction. However, as second rod 22 moves in an upward direction, camming cleats 24 and 26 slide over cable 23 and do not cause the cable to move in any appreciable fashion. Thus, as the process of cranking second rod 22 about rivet 28 repeatedly from its position in FIG. 2 to its position in FIG. 3, the rear end of snowmobile 10 is progressively lifted from trench 13.

After snowmobile 10 has been raised a sufficient height to effectively remove its rear end from trench 13, lateral force can be exerted on either the rear end of the snowmobile or on first rod 22 causing first rod 22 to sway from its vertical orientation as shown in FIG. 1. If sufficient lateral force is exerted, first rod 21 can completely collapse from its vertical orientation while the rear end of the snowmobile 10 collapses to the surface of snow 14 out of and away from trench 13. At that point in time, the device of the present invention can be removed from the snowmobile by simply unhooking connector 16 from handle portion 15. The device can then be prepared for storage.

Figure 6:
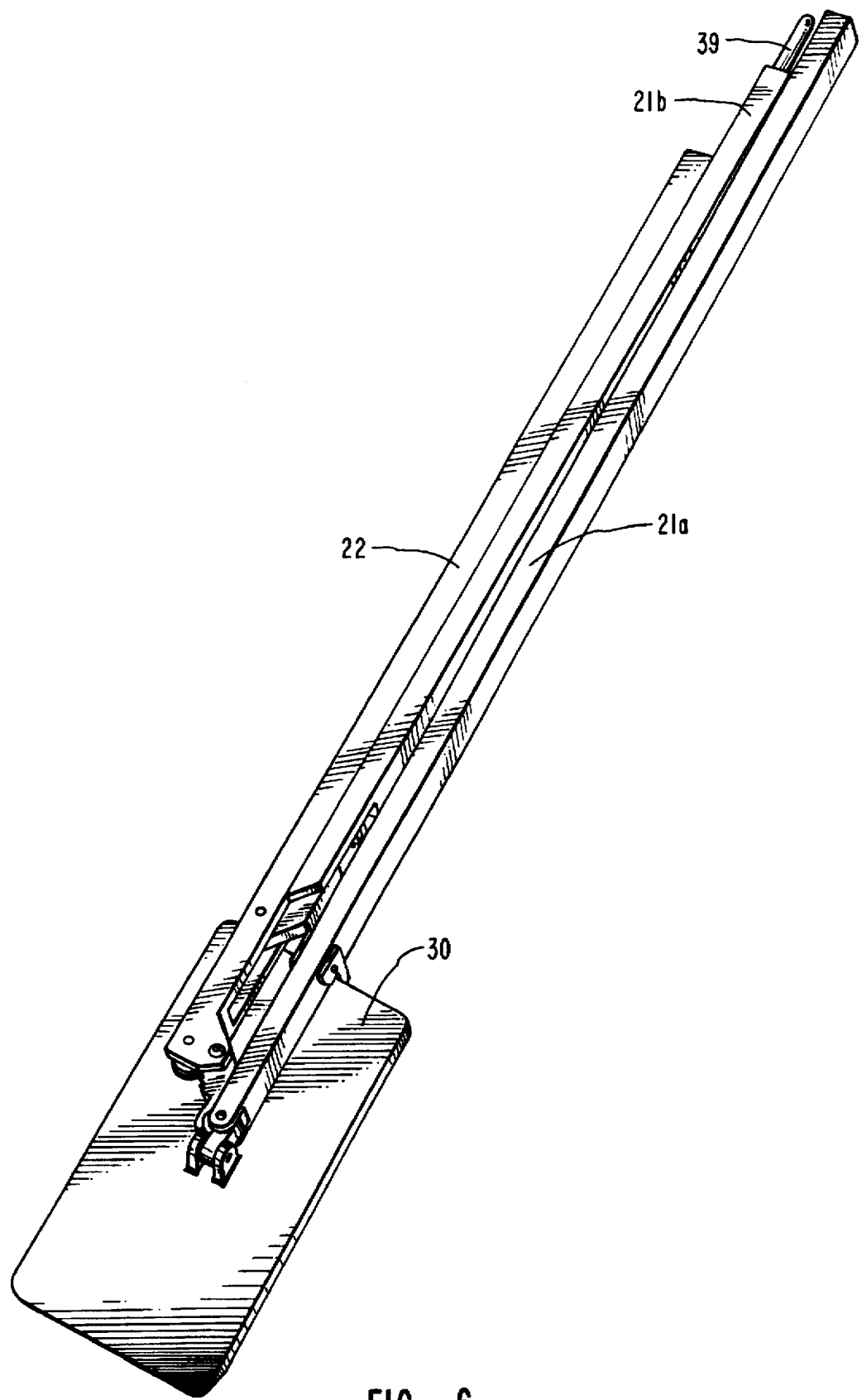
FIG. 6 shows a perspective view of the present invention in a collapsed, or stored, condition.

Device 20 of the present invention can be stored by first removing cable 23 from rods 21 and 22. This can be done by rotating cleats 24 and 26 such as by pulling extended handle portion 29 of cleat 24 and rotating cleat 26 to enable cable 23 to be pulled from engagement with camming cleats 24 and 26 once the cable has been detached from rod 21 at attachment point 17. Once done, rod 21 can swivel on support pad 30 through pin 32 (FIG. 4) enabling rod 21, rod 22 and support pad 30 to fold into a substantially single plane for storage as shown in FIG. 6. As further noted by viewing FIG. 6, rod 21 can be segmented into sections 21A and 21B, the latter being provided with male connection 39 to provide for a more convenient storage configuration while enabling rod 21 to have an appropriate vertical height once assembled to enable a snowmobile to rise from an entrenched position to free its track-like belting from being entrenched in the snow.

Figure 4:
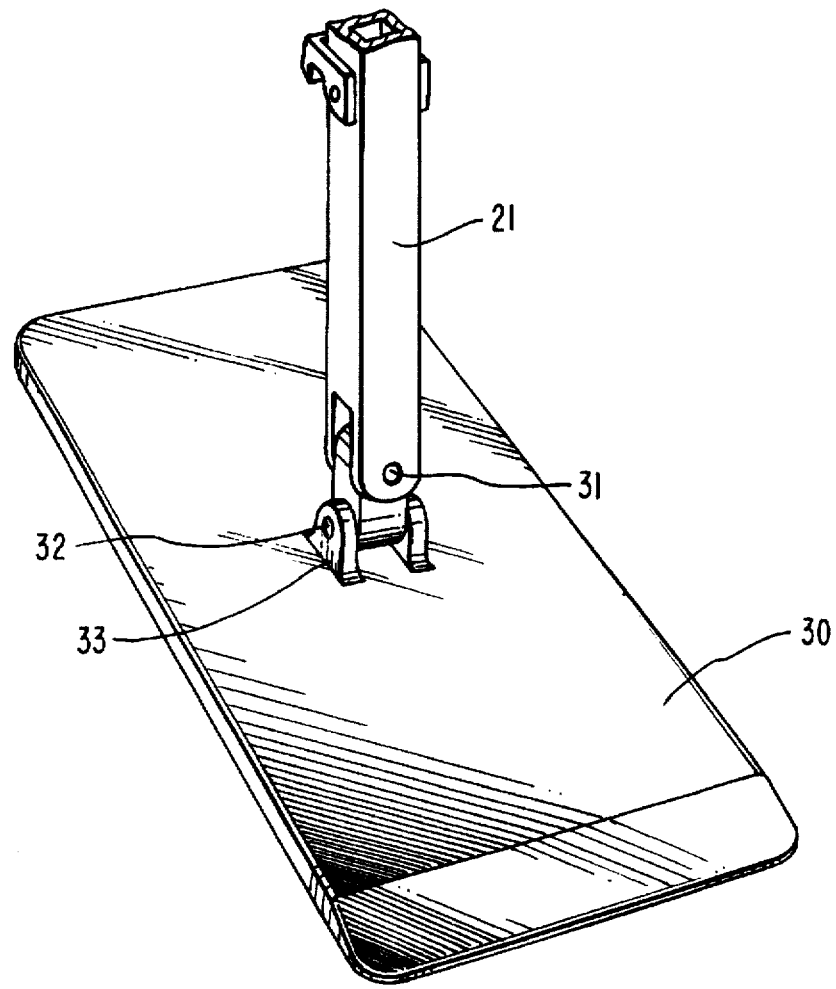
FIGS. 4 and 5 show the top surface and underside of support pads which constitute a portion of the present invention.
Figure 5:
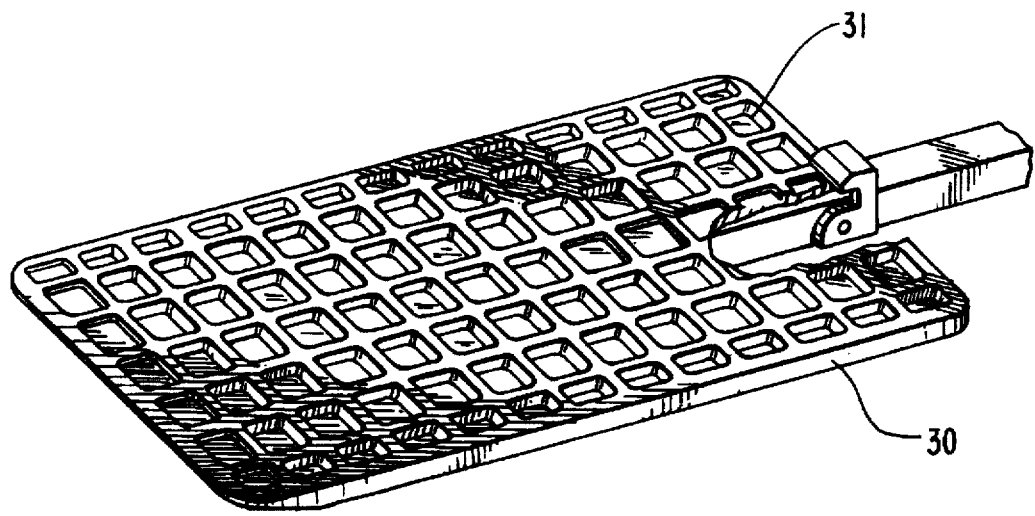

In viewing FIGS. 4 and 5, it is seen that support pad 30 is, in its preferred embodiment, rectangularly shaped although square, circular and oval shapes would likewise constitute appropriate support pads. The purpose of support pad 30 is to provide a large enough planar surface area to prevent the device of the present invention from sinking too deeply into snow 14 as the vertical force vector exerted upon first rod 21 increases as snowmobile 10 is lifted from trench 13. In this regard, support pad 30 can be provided with indents 31 on its underside (FIG. 5) to stabilize support pad 30 during operation. Further, as a preferred embodiment in enhancing the practicality of the present invention, first rod 21 can be appended to support pad 30 at its approximate geometric center by support lugs 33 housing shaft 32 providing for the free rotation of rod 21 in a first plane and second shaft 31 facilitating rotation of rod 21 in a second plane. These various planes of orientation enable the user to employ the present invention even in situations where snow adjacent the snowmobile is uneven and in situations where the terrain prevents the ideal location of pad 30 adjacent the rearward end of the snowmobile.

The second embodiment of the present invention can be readily appreciated by viewing FIGS. 7 and 8. In this regard, it is shown that cable 40 can cause to pass over pulley wheel 42 which is pivoted at axis 43. Along cable 40 is located cable buttons 41 periodically spaced along the entire cable length.

Again, referring to FIGS. 7 and 8, pulley wheel 42, located proximate the second end of the first rod 44 is provided with indents 52 and 53 which are spaced to receive cable buttons 41. Cable 40, upon passing over pulley wheel 42 is confronted by clip 46 and stop 54. It is noted that clip 46 is biased toward stop 54 so that an edge of stop 54 and an edge of clip 46 are in physical contact, the physical contact being removed when pressure is applied against clip 46 in the direction of arrow 60. Although not shown, when clip 46 and stop 54 are in contact, a channel 55 located at the interface between clip 46 and stop 54 is sized to allow the passage of cable 40 but not cable buttons 41. However, when cable 40 is drawn away from the snowmobile in the direction of the arrows shown along cable 40, cable movement is allowed for biased clip 46 will simply open against its spring bias allowing the cable buttons to pass. However, cable movement toward the snowmobile is prevented for the combination of clip 46 and stop 54 prevents the passage of cable buttons 41 unless or until pressure is put upon clip 46 in the direction of arrow 60 to open the space between clip 46 and stop 54 a sufficient distance to allow the passage of cable buttons 41.

It is further noted that cable 40 is caused to pass within open channel 56 found within end 51 of second rod 45. Open channel 56 is sized as to allow the free passage of cable 40 but the combination of open channel 56 and end 51 do not provide for the passage of cable buttons 41. Instead, cable buttons 41 are retained by second rod 45 at end 51 while second rod 45 is pivoted about axis 50 drawing the cable over pulley 42 and thus lifting snowmobile 10.

In operation, as handle 45 is raised, a progressively located cable button 41 is retained within open channel 56 and as handle 45 is pivoted downwardly, cable 40 proceeds to travel over pulley wheel 42 past clip 46 and stop 54. As handle 45 is raised, cable 40 is retained in position by the combination of clip 46 and stop 54 while a new section of cable is captured by open channel 56 by retaining the next progressively aligned cable button within said open channel.

Release of snowmobile 10 can be carried out by lifting handle 45 (FIG. 7) and opening clip 46 by placing pressure on clip 46 in the direction of arrow 60 whereupon the progressively aligned cable buttons 41 can freely pass over pulley 42 in the direction of snowmobile 10.

Although two specific embodiments have been recited herein in the form of FIGS. 2 and 3 and FIGS. 7 and 8, it is to be understood that the present invention is viewed as a device capable of being stowed on a snowmobile and assembled when needed to jack the rear end of the snowmobile from a trench. Broadly, the invention is in the form of two rods which pivot with respect to one another so that the rear of the snowmobile can be captured while one of the rods is pivoted with respect to the other. After the snowmobile has been removed from the trench, the invention further contemplates the ability to selectively release the cable thus allowing the snowmobile to reassume a horizontal orientation upon the top surface of the surrounding snow.

Since various modifications can be made to the present invention as hereinabove described, and many apparently widely different embodiments of the same invention can be made within the spirit and scope of the claims without departing from such spirit and scope, it is intended that all matter contained in the accompanying specification shall be interpreted as illustrative only and not in a limiting sense.

What is claimed:

1. A method for freeing a snowmobile entrenched in snow, said snowmobile having ski-shaped rudders at the snowmobile's forward end and track-shaped belting at the snowmobile's rearward end, said track-shaped belting being driven to propel said snowmobile through snow, said method comprising:

providing a device having a first rod of sufficient length such that when vertically positioned, said rod is of sufficient height to enable the snowmobile to rise from an entrenched position to free its track-shaped belting from being entrenched in snow;

providing a support pad located at a first end of said first rod;

providing a second rod pivotally connected to said first rod;

providing a cable attached to said first rod at the cable's first end and having attachment means at the cable's second end for attachment of said cable to said snowmobile at its rearward end; and providing a first guide and camming cleat located at the second end of said first rod for receiving and allowing for controlled one way travel of said cable and a second guide and camming means located on said second rod further receiving and allowing for controlled one way travel of said cable wherein said cable attachment means is attached to the rearward end of a snowmobile entrenched in snow, said cable passing through said first and second guide and camming cleats and placing said support pad proximate the rearward end of said snowmobile and said first rod extending vertically therefrom and wherein said second rod is pivotally moved repeatedly from a first to a second position resulting in progressive capture of said cable and resulting lifting of the rearward end of said snowmobile from the snowmobile's entrenched position.

2. The method of claim 1, wherein after the rearward end of said snowmobile has been lifted from the snowmobile's entrenched position, lateral force is exerted on either said snowmobile or first rod causing said first rod to sway from the first rod's vertical orientation and causing said snowmobile to reside on a snow surface adjacent said entrenched position.

3. The method of claim 2, wherein after said snowmobile has been caused to reside on said snow surface adjacent said entrenched position, rotating said camming cleats to remove said cable from said camming cleats and guides.

4. A method for freeing a snowmobile entrenched in snow, said snowmobile having ski-shaped rudders at the snowmobile's forward end and track-shaped belting at its rearward end, said track-shaped belting being driven to propel said snowmobile through snow, said method comprising:

providing a device having a first rod of sufficient length such that when vertically positioned, said rod is of sufficient height to enable to snowmobile to rise from an entrenched position to free the snowmobile's track-shaped belting from being entrenched in snow;

providing a support pad located at a first end of said rod;

removably attaching a cable to said snowmobile proximate the snowmobile's rearward end;

providing a second rod pivotally connected to said first rod;

providing a pulley wheel located at a second end of said first rod;

providing means located proximate said second end of said first rod for receiving said cable and for selectively preventing said cable from passing over said pulley in a direction toward said snowmobile;

providing means located on said second rod for capturing said cable and drawing said cable in a direction away from said snowmobile as said second rod is moved pivotally with respect to said first rod;

drawing said cable over said pulley wheel located at said second end of said first rod and through said means for preventing said cable from passing over said pulley in a direction toward said snowmobile and passing said cable through said means located on said second rod for capturing said cable, and pivoting said second rod with respect to said first rod repeatedly to draw said cable in a direction away from said snowmobile thus lifting the rearward end of said snowmobile from its entrenched position.

5. A device for fleeing a snowmobile entrenched in snow, said snowmobile having ski-shaped rudders at the snowmobile's forward end and track-shaped belting at the snowmobile's rearward end, said track-shaped belting being driven to propel said snowmobile through snow, said device comprising:

a first rod of sufficient length such that when vertically positioned said first rod is of sufficient height to enable the snowmobile to rise from an entrenched position to free the snowmobile's track-shaped belting from being entrenched in snow;

a support pad located at a first end of said first rod;

a second rod pivotally connected to said first rod;

a cable attached to said first rod at the cable's first end and having attachment means at the cable's second end for attachment of said cable to said snowmobile at its rearward end; and a first guide and first camming cleat located at the second end of said first rod for receiving and allowing for controlled one way travel of said cable and providing a second guide and a second camming cleat located on said second rod further receiving and allowing for controlled one way travel of said cable.

6. The device of claim 1, wherein said second rod is pivotally located on said first rod near the second end thereof.

7. The device of claim 1, wherein said first rod is pivotally attached to said support pad at the first end thereof.

8. The device of claim 1, wherein said first rod is attached to said support pad at its geometric center.

9. The device of claim 1, wherein said first and second camming cleats provide for one way travel of said cable therethrough when each are in a first position and each provide for cable travel in an opposite direction when said first and second camming cleats are in a second position.

10. The device of claim 1, wherein said first rod, second rod and pad are pivoted with respect to one another such that the device can be folded into a single plane for storage.

11. A device for freeing a snowmobile entrenched in snow, said snowmobile having ski-shaped rudders at the snowmobile's forward end and tracks-shaped belting at its rearward end, said track-shaped belting being driven to propel said snowmobile through snow, said device comprising a first rod of sufficient length such that when vertically positioned, said first rod is of sufficient height to enable the snowmobile to rise from an entrenched position to free the snowmobile's track-shaped belting from being entrenched in snow;

a support pad located at a first end of said first rod;

a second rod pivotally connected to said first rod;

a cable removable attachable to said snowmobile proximate its rearward end;

a pulley wheel located at a second end of said first rod;

means located proximate said second end of said first rod for receiving said cable and selectively preventing said cable from passing over said pulley in a direction toward said snowmobile; and means located on said second rod for capturing said cable and drawing said cable in a direction away from said snowmobile as said second rod is moved pivotally with respect to said first rod.

12. The device of claim 11 wherein said cable is provided with cable buttons periodically fixedly attached to said cable along the cable's length.

13. The device of claim 12 wherein said means located proximate said second end of the said first rod for receiving said cable and for selectively preventing said cable from passing over said pulley comprises the combination of a clip and stop wherein said clip is spring biased towards said stop and wherein said cable and cable buttons can freely be drawn in a direction away from said snowmobile but said cable buttons are prevented from passing in a direction toward said snowmobile without moving said clip against the clip's spring bias.

14. The device of claim 12 wherein said means located on said second rod for capturing said cable comprises an open channel, said open channel being sized to freely allow the passage of said cable but not said cable buttons.

15. The device of claim 11 wherein said first rod is pivotally attached to said support pad at said first end thereof.

16. The device of claim 11 wherein said first rod is attached to said support pad at its geometric center.

17. The device of claim 11 wherein said first rod, second rod and pad are pivoted with respect to one another such that the device can be folded into a single plane for storage.

* * * * *